UNITED STATES PATENT OFFICE.

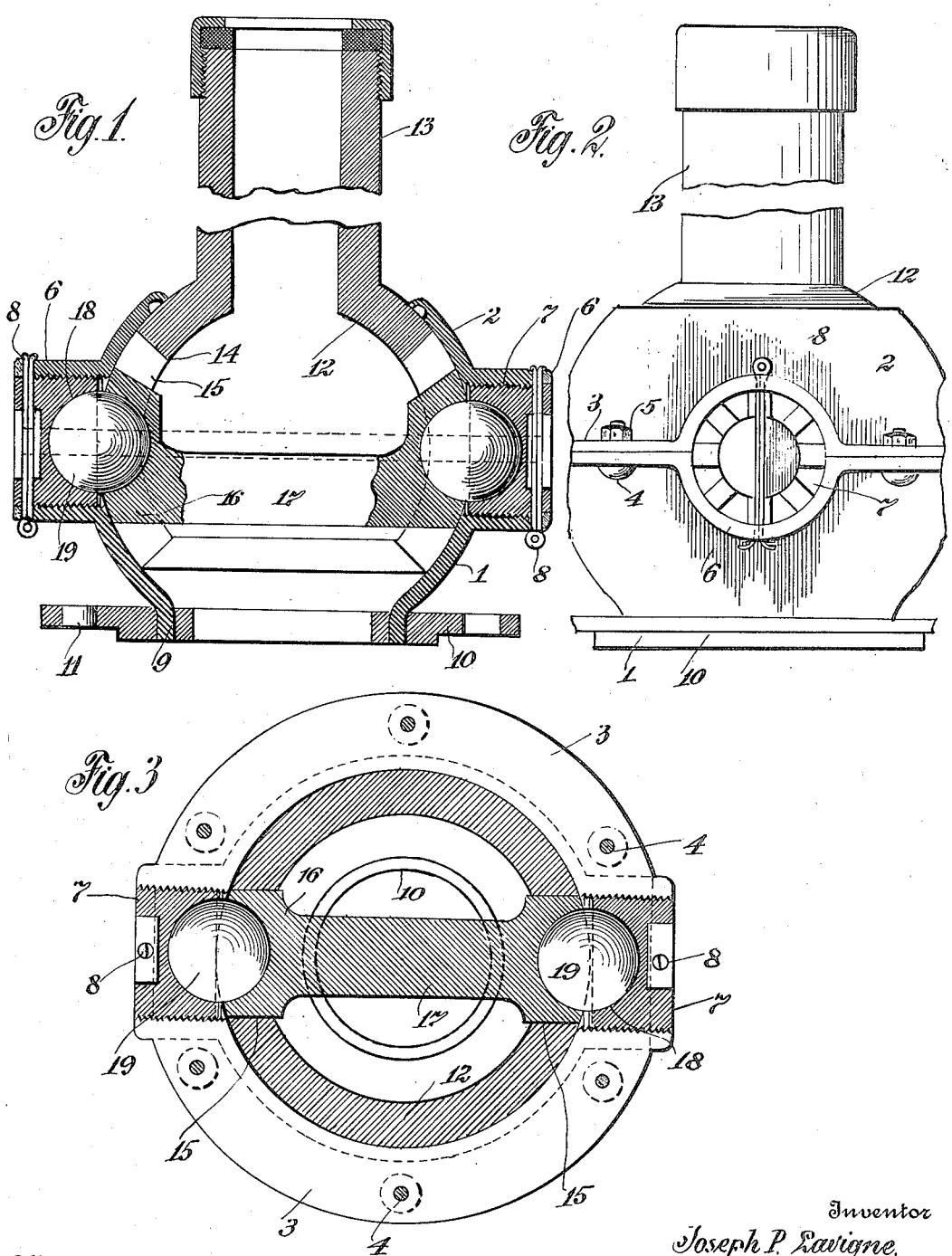

JOSEPH P. LAVIGNE, OF DETROIT, MICHIGAN, ASSIGNOR TO DETROIT MECHANICAL ENGINEERING COMPANY, OF DETROIT, MICHIGAN, A CORPORATION OF MICHIGAN.

UNIVERSAL JOINT.

1,324,315. Specification of Letters Patent. Patented Dec. 9, 1919.

Application filed March 13, 1919. Serial No. 282,346.

*To all whom it may concern:*

Be it known that I, JOSEPH P. LAVIGNE, a citizen of the United States of America, residing at Detroit, in the county of Wayne and State of Michigan, have invented certain new and useful Improvements in Universal Joints, of which the following is a specification, reference being had therein to the accompanying drawings.

This invention relates to universal joints, and has special reference to that type of joint including a sectional socket member, a ball member therein, and trunnion members between the socket member and the ball member.

The object of my invention is to provide a simple, durable and inexpensive universal joint having a novel trunnion member in sliding engagement with the ball member and articulated with the socket member so that said socket member can be moved relative to the trunnion members and the ball member within the socket member.

I attain the above object by a mechanical construction that will be hereinafter specifically described and then claimed, and reference will now be had to the drawing, wherein—

Figure 1 is a longitudinal sectional view of a universal joint in accordance with my invention;

Fig. 2 is a side elevation of the same partly broken away, and

Fig. 3 is a cross sectional view of the universal joint.

The socket member of the universal joint is composed of two somewhat semi-spherical shells 1 and 2 having peripheral flanges 3 adapted to be connected by screw bolts 4, nuts 5 or other fastening means. The flanges 3 at diametrically opposed sides of the socket member are provided with opposed offset portions to form cylindrical housings 6 and the inner walls of said housings are screw-threaded to receive nuts 7. These nuts have the outer ends thereof recessed or grooved or castellated to facilitate mounting the nuts within the housings, also to permit of cotter pins 8 or the like fastening means being employed for locking the nuts in position.

The shell 1 of the socket member has lugs 9 secured in a cap 10 and the cap has openings 11 so that any fastening means may be employed for connecting said cap to another element.

Movable in the socket member is a hollow ball member 12 having the usual shaft coupling 13. The hollow ball member 12 is provided with diametrically opposed slots 14 having bearing faces 15 for trunnion blocks 16 and these blocks are connected by a web or bar 7, so that said blocks will move in synchronism. The trunnion blocks 16 and the inner ends of the nut 17 have the confronting faces thereof provided with semi-spherical seats 18 for balls or spherical bodies 19, and in this manner the socket member is articulated relative to the trunnion member, so as to establish a driving connection between the ball member 12 and the socket member and yet permit of a universal movement.

From the foregoing it will be observed that the parts of the universal joint can be easily assembled and thoroughly lubricated, and while one embodiment of my invention has been illustrated, it is to be understood that the structural elements are susceptible to such variations and modifications as fall within the scope of the appended claims.

What I claim is:—

1. In a universal joint, a socket member, a slotted ball member therein, connected trunnion blocks in the slots of said ball member, and spherical bodies in said trunnion blocks extending into said socket member.

2. In a universal joint, a sectional socket member provided with housings, nuts in the housings of said socket member, a ball member in said socket member, connected trunnion blocks in said ball member and spherical bodies in said trunnion blocks extending into said nuts.

3. In a universal joint, a sectional socket member, nuts between the sections of said socket member, a slotted ball member in said socket member, connected trunnion blocks in said ball member, and spherical bodies between said trunnion blocks and said nuts.

In testimony whereof I affix my signature in the presence of two witnesses.

JOSEPH P. LAVIGNE.

Witnesses:
LEWIS E. FLANDERS,
G. E. McGRANN.